June 20, 1967 M. FRATTALLONE 3,325,850
CLEANING APPLIANCE ATTACHABLE TO A CONTAINER
Filed Dec. 21, 1964
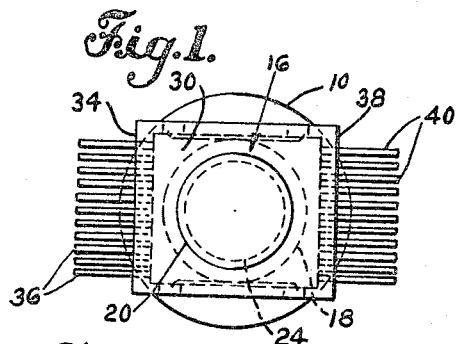
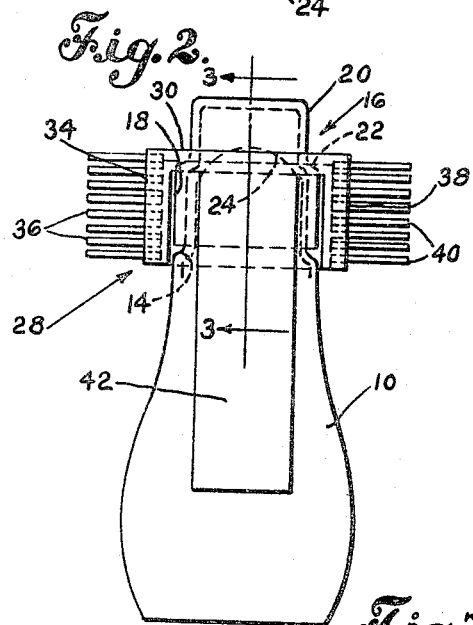
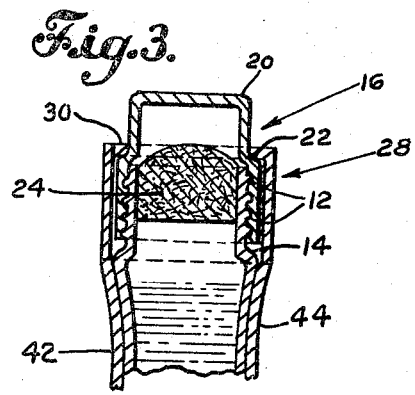
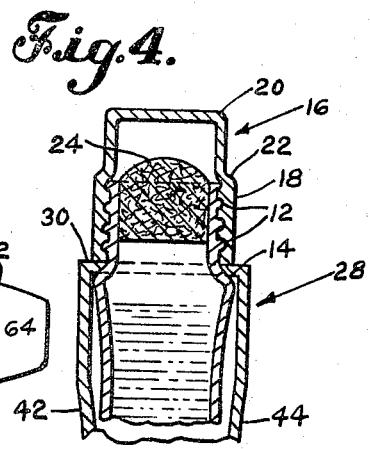
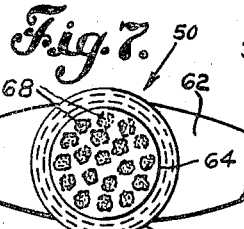
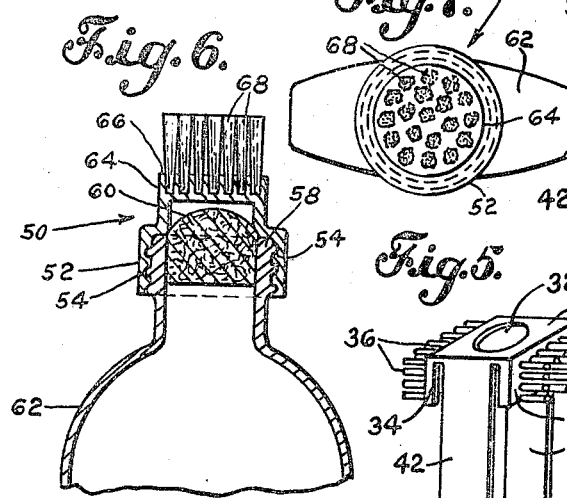
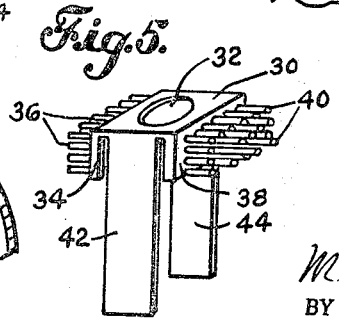
INVENTOR.
Michele Frattallone
BY Harold E. Cole
Attorney

# United States Patent Office 3,325,850
Patented June 20, 1967

3,325,850
CLEANING APPLIANCE ATTACHABLE TO A CONTAINER
Michele Frattallone, 34 Prospect St., Lynn, Mass. 01902
Filed Dec. 21, 1964, Ser. No. 419,760
3 Claims. (Cl. 15—534)

This invention relates to an appliance which is attachable to a container.

Oftentimes when one is about to polish or apply a coating or other material, to articles, such as shoes for instance, it is important to clean the article before doing so. Accordingly my purpose is to provide a cleaning means that is carried by the container for holding the polish or other material, and especially bristles as that means.

Another object is to provide an appliance carrying said cleaning means that can easily be temporarily connected to a cover for said container prior to its use so the container and appliance will be associated together before reaching the hands of a consumer.

Still another object is to provide such an appliance that once it reaches the consumer can easily be moved to a position of use on the container and kept there indefinitely, and yet can easily be removed should it be desired to use the appliance on another container.

A further object is to provide such an appliance that can be made in large quantities, at relatively low cost and is easily made adapatable to various sizes of containers.

The foregoing and other objects which will appear as the nature of the invention is better understood, may be accomplished by a construction, combination and arrangement such as is disclosed by the drawing. The nature of the invention is such as to render it susceptible to various changes and modifications, and therefore, I am not to be limited to the particular construction disclosed by the drawing nor to that described in the specification; but am entitled to all such changes therefrom as fall within the scope of my claims.

In the drawing:

FIG. 1 is a top plan view of a container with my appliance connected thereto.

FIG. 2 is a side elevational view thereof.

FIG. 3 is a sectional view taken on the line 3—3 of FIG. 2.

FIG. 4 is a view similar to FIG. 3; but showing the appliance in position of use on the container.

FIG. 5 is a perspective view of my appliance on a reduced scale.

FIG. 6 is a longitudinal, fragmentary, sectional view of a modification of my invention, showing another type of appliance attached to the container cover.

FIG. 7 is a top plan view of the appliance, cover and container shown in FIG. 6.

As illustrated, a container 10, which may hold material such as liquid shoe polish, a lubricant or the like, has the usual threaded neck 12 and a shoulder 14 below said neck. The usual cap or cover 16 for said container 10 has a main body or lower portion 18 that screw-threadedly connects with said threaded neck 12. It also has an upper and narrower portion 20 as shown, thus providing an exterior shoulder 22 between said lower and upper portions. A well-known applicator 24 extends into the interior of said container neck 12.

An appliance 28 is attachable to said container 10. It has a top 30 with a hole 32 in it. From said top 30 a side 34 extends downwardly having bristles 36 set therein that extend laterally outward. Another side 38, opposite side 34, also has bristles 40 set therein similar to bristles 36. It would be sufficient to have bristles at one of said sides 34 or 40 to serve for cleaning as, for instance, when brushing shoes before applying shoe polish, or giving them a polish afterwards. However, it is helpful to have two different brushes which provide a choice.

Extending from said top 30 is a retainer 42 that continues below said appliance 28 and is opposite the main body of the container below said shoulder 14. Another retainer 44 is similar to retainer 42, being at a side opposite the latter. When my attachment is used the hand extends around said retainers 42 and 44, which are attached at right angles to said sides 34 and 38 to thereby hold my attachment firmly in position of use, since they will be held against the sides of the container.

When my attachment is not in use, or when the container is on display, as in a store, said holder 28 may rest on said upper shoulder 22, shown in said FIG. 3, thus keeping it associated with said container.

When ready for use said cover 16 is removed and said appliance is slipped over the upper body portion 20 until it reaches said lower shoulder 22, where it will rest.

In said FIG. 6 I show a modified form of brush attachment, in which a cover 50 has a lower portion 52 that is interiorly screw-threaded as at 54 to make screw-threaded attachment on the neck 58 of a container 62 within which an applicator 60 is set. Said cover 50 has an outside portion 64 having outwardly extending portions 66 spaced apart between which are bristles 68. In this form a shoe or other article may be brushed by said bristles while holding the container 62 in one's hand with the bristles pointing outwardly.

What I claim is:

1. In combination, a container and an appliance for attachment thereto, said container having a neck and a cover attachable to said neck, and a shoulder below said neck, said appliance comprising a top having a hole therein enabling said appliance to fit over said cover and rest on said shoulder, a side extending angularly from said top, bristles fixed in said side and extending laterally therefrom, and two retainers extending from said top at a right angle to said side and to a point opposite the main body of said container.

2. In combination, a container and an appliance for attachment thereto, said container having a neck and a cover attachable to said neck, said cover having a relatively narrow upper portion and a relatively wide lower portion thereby providing a shoulder between said portions, said appliance comprising a top having a hole therein enabling said appliance to fit over and rest on said shoulder, a side extending angularly from said top, bristles fixed in said side and extending laterally therefrom, and two retainers extending from said top at a right angle to said side to a point below said neck and opposite the main body of said container.

3. In combination, a container and an appliance for attachment thereto, said container having a neck and a cover attachable to said neck, said cover having a relatively narrow upper portion and a relatively wide lower portion thereby providing a shoulder between said portions, said appliance comprising a top having a hole therein enabling said appliance to fit over and rest on said shoulder, said container having another shoulder that is below said neck, said top being adapted to rest on said other shoulder, a side extending angularly from said top, bristles fixed in said side and extending laterally therefrom, and two retainers extending from said top at a right angle to said side to a point below said neck and opposite the main body of said container.

References Cited
UNITED STATES PATENTS

| | | | |
|---|---|---|---|
| 1,830,860 | 11/1931 | Scoles | 15—556 |
| 2,212,513 | 8/1940 | Deitrich et al. | 15—536 X |
| 2,260,100 | 10/1941 | Deitrich et al. | 15—536 X |
| 2,724,849 | 11/1955 | Schultz | 15—592 X |
| 2,741,786 | 4/1956 | Bressler | 15—187 X |
| 2,828,500 | 4/1958 | Peacock | 15—546 |
| 3,052,910 | 9/1962 | Kushner | 15—545 X |

CHARLES A. WILLMUTH, *Primary Examiner.*

S. E. BECK, E. L. ROBERTS, *Assistant Examiners.*